(12) United States Patent
Behling

(10) Patent No.: US 6,805,480 B1
(45) Date of Patent: Oct. 19, 2004

(54) CYLINDER FOR A TWIN-SCREW EXTRUDER WITH A HELICAL CHANNEL OF VARYING DEPTH

(75) Inventor: Michael Behling, Hameln (DE)

(73) Assignee: Berstorff GmbH, Hannover (DE)

( * ) Notice: Subject to any disclaimer, the term of this patent is extended or adjusted under 35 U.S.C. 154(b) by 60 days.

(21) Appl. No.: 10/069,218
(22) PCT Filed: Aug. 22, 2000
(86) PCT No.: PCT/DE00/02896
§ 371 (c)(1), (2), (4) Date: Jun. 6, 2002
(87) PCT Pub. No.: WO01/14121
PCT Pub. Date: Mar. 1, 2001

(30) Foreign Application Priority Data

Aug. 24, 1999 (DE) .......................... 199 41 160

(51) Int. Cl.$^7$ .............................................. B29C 47/82
(52) U.S. Cl. ........................................ 366/84; 366/149
(58) Field of Search ...................... 366/69, 79, 83–85, 366/88–89, 144, 149, 297–301, 318; 425/204, 208, 209

(56) References Cited

U.S. PATENT DOCUMENTS

| | | | |
|---|---|---|---|
| 3,416,774 A | * 12/1968 | Fritsch | 366/90 |
| 3,590,429 A | * 7/1971 | Bammert et al. | 425/192 R |
| 3,900,188 A | * 8/1975 | Seufert | 366/145 |
| 4,028,027 A | * 6/1977 | Worz | 418/201.1 |
| 4,127,331 A | * 11/1978 | Herbert et al. | 368/83 |
| 4,235,581 A | * 11/1980 | Anders | 425/378.1 |
| 4,385,876 A | * 5/1983 | Scherping et al. | 418/201.1 |
| 4,415,268 A | * 11/1983 | Brinkmann et al. | 366/85 |
| 4,643,660 A | * 2/1987 | Capelle | 425/190 |
| 4,702,695 A | * 10/1987 | Blach | 432/154 |
| 5,549,383 A | * 8/1996 | Knoll et al. | 366/149 |
| 5,816,699 A | * 10/1998 | Keith et al. | 366/84 |

FOREIGN PATENT DOCUMENTS

| | | | |
|---|---|---|---|
| DE | 2061700 | * | 7/1971 |
| DE | 2208238 A | * | 8/1973 |
| DE | 2659037 A1 | * | 6/1978 |
| DE | 2756752 A1 | * | 6/1979 |
| DE | 3540024 A1 | * | 5/1986 |
| DE | 3831783 A1 | * | 4/1990 |
| DE | 4226350 A1 | * | 3/1993 |
| DE | 4235430 A | * | 4/1994 |
| DE | 4323941 A1 | * | 1/1995 |
| EP | 42466 A1 | * | 12/1981 |
| EP | 318667 A2 | * | 6/1989 |

* cited by examiner

Primary Examiner—Charles E. Cooley
(74) Attorney, Agent, or Firm—Cohen, Pontani, Lieberman & Pavane

(57) ABSTRACT

A cylinder assembly for a twin-screw extruder includes a cylinder forming an extrusion space and a hollow-cylinder mantle surrounding the cylinder and having a smooth inner surface. At least one channel is made in the shape of a helix in the longitudinal direction on the outside of the cylinder. The at least one channel is connected to an intake and outlet for conducting a tempering medium. The at least one channel is made by a winding-vortex process and the at least one channel is closed by the hollow-cylinder mantle. The cycle depth of the at least one channel in the radial direction changes over the circumference of the cylinder such that it is greatest in regions where the original wall thickness of the cylinder is greatest, and that it is smallest in the regions where the original wall thickness of the cylinder is also smallest.

10 Claims, 3 Drawing Sheets

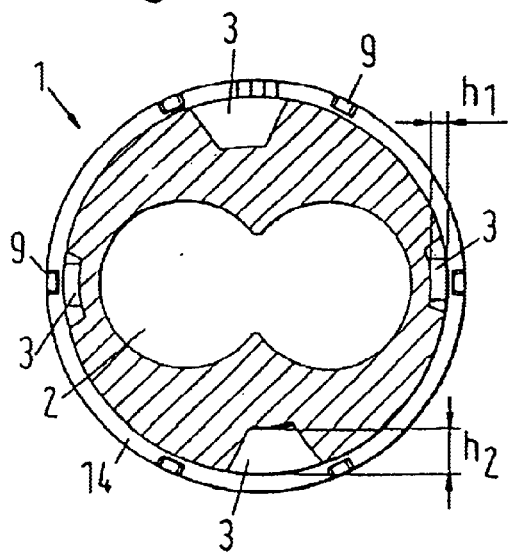
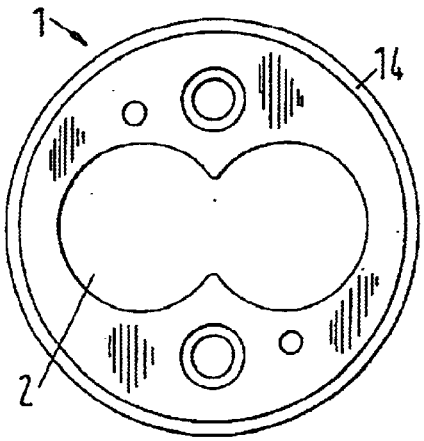
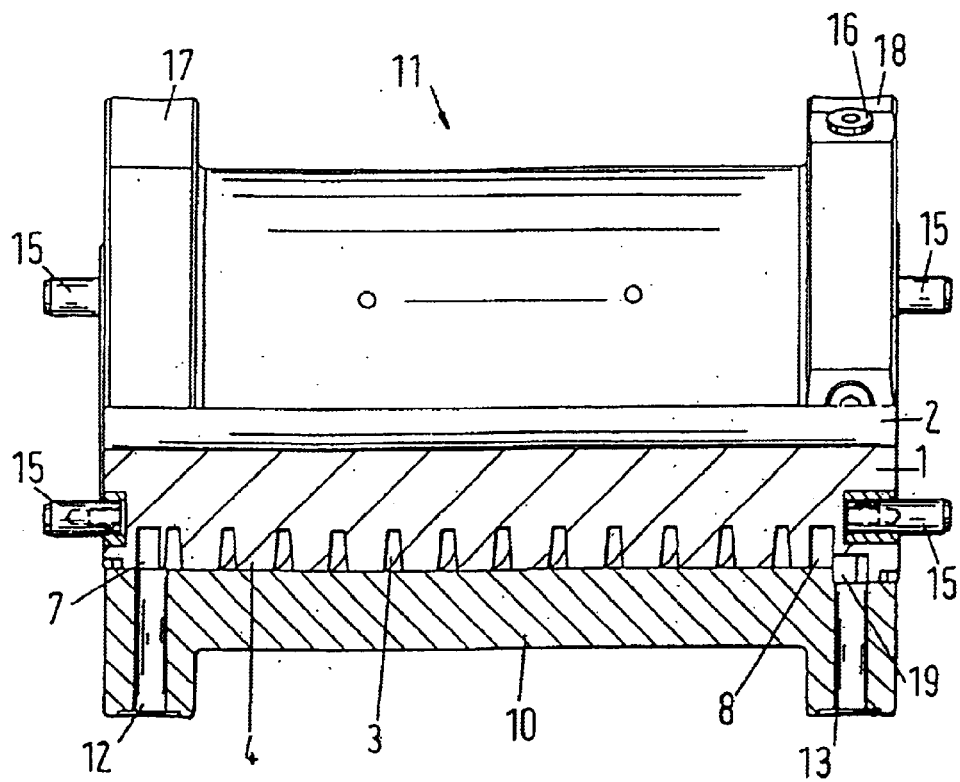

CYLINDER FOR A TWIN-SCREW EXTRUDER WITH A HELICAL CHANNEL OF VARYING DEPTH

PRIORITY CLAIM

This is a U.S. national stage of application No. PCT/DE00/02896, filed on Aug. 22, 2000. Priority is claimed on that application and on the following application:

Country: Germany, Application No.: 199 41 160.3, Filed: Aug. 24, 1999.

BACKGROUND OF THE INVENTION

1. Field of the Invention

This invention relates to a twin-screw extruder with cylinder surrounding the twin-screws of the extruder and a hollow cylinder mantle surrounding the cylinder.

2. Description of the Prior Art

Screw extruders are used in many ways in the processing of plastics. In order to provide a work result of qualitatively high value, it is important that the plastic being processed be extruded in a manner that is as uniform as possible and within an optimal temperature range. The cylinder of the extruder, which is provided with a hole corresponding to the dimensions of the screw unit, which form the extrusion space for the plastic to be processed, is therefore generally pulled through channels in its wall, through which a tempering medium that is capable of flowing (as a rule for cooling, but also for heating) can be fed.

A cylinder for a twin-screw extruder is known from EP 00 42 466 A1, which consists of two coaxial parts, one fed into the other, namely an inner cylinder part, which has a double hole (extrusion space) for the twin-screw unit, shaped like spectacles, and an outer, hollow-cylinder mantle, which lies close to and surrounds the inner cylinder part and with respect to which the forces exerted by the extrusion pressure fulfill a carrier function. In this case, both the inner cylinder part and the hollow-cylinder mantle are pulled through channels running in the longitudinal direction of the cylinder for a tempering medium. In order to be able to cool the extrusion space as effectively as possible also in the region of its thickest wall, namely in the region of the spandrel of the spectacle-shaped hole, cooling channels are arranged in the inner cylinder part in the region of this spandrel. In the nearby region of the planes through the longitudinal axes of the twin-screw unit, cooling of the extrusion space occurs mainly through the cooling channel of the hollow-cylinder outer mantle. This means that, for this, the heat from the inner cylinder-part must flow over into the hollow-cylinder mantle. This is prevented by the separation seam between the two parts of the cylinder. Therefore, the use of heat-conducting pastes has been recommended, with greater or less success, in order to improve the heat transfer in this critical region. From the viewpoint of manufacturing technology, this solution has the disadvantage that cooling channels must be made in both parts of the cylinder. Also, the hollow-cylinder mantle cannot also be used as the inner cylinder of a single-screw extruder, since the cooling channels are concentrated on only one part of its circumference.

Another structure for the cylinder of a twin-screw extruder is known from DE 26 59 037 C3, which likewise consists of an inner cylinder part and a hollow-cylinder mantle. For cooling of the extrusion space, a cooling channel is provided that has a course similar in principle to a helix. The cooling channel is arranged in the region of the surface separating the inner cylinder part and the hollow-cylinder mantle. In this case it is composed of partial pieces of different shapes, in the following manner on the upper side of the inner cylinder part, grooves are etched at equal distances from one another, with vertical walls, in such a way that the bottoms of the grooves are all parallel to the longitudinal axes of the planes in the twin-screw unit, the direction with respect to the longitudinal axis is chosen, however, at exactly the opposite angle. The arrangement of the upper and lower grooves and their distances are selected in such a way that their ends overlap pair-wise. In order to connect the overlapping ends in view of joining the tempering media, sickle-shaped connecting grooves are etched on the inner surface of the hollow-cylinder mantle. The cooling channels generated in this manner, which run like helices, have the advantage that the tempering medium in the region of the spandrel of the spectacle-shaped hole is brought to the extrusion space relatively densely. From the viewpoint of manufacturing technology, creating of the cooling channel still requires a comparably high expense, since not only must the grooves be etched on the upper and lower side of the inner cylinder part, but etching work is also necessary on the inner side of the hollow-cylinder mantle. In addition, the hollow-cylinder mantle produced in this way is only usable for the corresponding inner cylinder part of a twin-screw extruder, but not as an inner cylinder part for a single-screw extruder.

Another solution for a cylinder of a twin-screw extruder that has an inner cylinder part and a hollow-cylinder mantle surrounding it is known from DE-OS 20 61 700, which is the overall state of the art. The wall of the inner cylinder part is cut through with numerous adjacent grooves above, below, and to the side of the spectacle-shaped hole for the twin-screw unit. The bottoms of these grooves run in straight-line segments or in arcs in such a way that the remaining wall to the extrusion space has approximately the same thickness everywhere. This requires a correspondingly high manufacturing cost. In order for connect the individual grooves into a channel running like a helix for the cooling medium, the grooves on the bottom side of the inner cylinder part are connected together in such a way that three partial pieces, two of which run perpendicular to the longitudinal axis of the twin-screw unit and a middle one is directed at an angle to the longitudinal axis, in such a way that an overflow from one winding of the cooling channel to the next results. This in turn leads to an increase in manufacturing costs for the inner cylinder part. Since walls (bridges) remaining between the individual windings of the cooling channel should serve to transfer loads to the hollow-cylinder mantle that surrounds the inner cylinder part, the bridges, which have relatively small dimensions, arranged above and below the spectacle-shaped hole of the extrusion space and were originally especially high, are etched on a surface parallel to the plane of the twin-screw unit. On this etched surface, the bridges are each made in a cylinder section formed from filling material on the upper side and on the lower side of the inner cylinder part, the outer contour of the cylinder section corresponding to the hollow-cylinder mantle. These cylinder sections cover the individual windings of the cooling channels from top to bottom. In this way, the cross-section of the cooling channel, when viewed from above the circumference, remains approximately uniform in size. Although this known construction makes it possible to use a hollow-cylinder mantle with a smooth inner surface, it not only requires an increased manufacturing cost to generate the individual winding of the cooling channel, but also an additional cost for creating the two cylinder segments.

SUMMARY OF THE PRESENT INVENTION

The object of the present invention is to develop a cylinder for a twin-screw extruder so that the manufacturing cost required remains as small as possible, whereby an especially uniform and effective tempering of the extrusion space is to be provided. In addition, the hollow-cylinder mantle of the cylinder should be usable universally, as far as possible. Specifically, it should be usable for single-screw as well as twin-screw extruders.

The object of the present invention is met by a cylinder assembly for a twin-screw extruder having a cylinder with a variable wall thickness which defines an extrusion space for receiving twin screws of the twin-screw extruder. A hollow-cylinder mantle surrounds the cylinder. At least one channel having a helical shape and a cycle depth is formed on an outer side of the cylinder by a winding vortex process. An inlet and outlet are formed in the hollow-cylinder mantle in communication with the at least one channel for allowing a flow of a tempering medium from the inlet to the outlet via the at least one channel. The hollow-cylinder mantle closes the at least one channel. The cycle depth of the at least one channel varies along the circumferential direction of the cylinder such that the cycle depth is largest in regions where the wall thickness of the cylinder is largest and the cycle depth is smallest in regions where the wall thickness of the cylinder is smallest.

The present invention starts from a twin-screw extruder with a cylinder, which surrounds the twin-screw of the extruder, forming an extrusion space. The cylinder is surrounded in turn by a hollow-cylinder mantle, the inner surface of which is made smooth. On the outer side of the cylinder, at least one channel is built in, which extends in the form of a helix in the longitudinal direction of the cylinder and can be connected for conducting a tempering medium. In the state of the art, the channel formed as a helix is closed in the radial direction through a part of the cylinder by separately produced cylinder sections, while the corresponding connection in the other regions of the circumference are closed directly by the hollow-cylinder mantel. In contrast the channels in the cylinder constructed according to the invention is/are closed over the entire circumference by the hollow-cylinder mantel itself. Thus no components are needed that correspond to the cylinder sections from the overall state of the art. A significant cost reduction for the cylinder according to the invention results from the circumstance that the channel(s) for the tempering medium are generated by a winding vortex. This involves an especially simple manufacturing process that can be implemented by placing the piece under tension and generating channels with a completely uniform helical course, which is a great advantage for the flow-through of the tempering medium. The channel(s) thus have no sudden kinks or other flow obstacles.

In principle, the cylinder can be provided with a single channel with a helical shape. In most cases, however, it will be appropriate, such as with multiple windings, to provide several channels next to one other. Advantageously, there will be three or four such channels running parallel to one another on the outside of the cylinder. The pitch of the channel(s) will generally be kept constant over the length of the cylinder. In individual cases, however, it may be reasonable to change this pitch, in order to affect the dwell time of the tempering medium in a particular section of the cylinder along its longitudinal axis. By selecting a large pitch, the tempering medium can be fed in the direction in which the extruder moves or even in the opposite direction, as needed.

In many cases, a rectangular shape may be provided for the channel(s). The depths of each channel in the radial direction, i.e. its cycle depth, may remain constant over the circumference of the cylinder. The advantage is that the wall thickness of the extrusion space is likewise constant over the circumference and thus the flow patch through the wall of the extrusion space for the heat to be transported—seen over the circumference—likewise remains constant. In regard to the arrangement of the individual windings of the channel(s) of the cylinder, it has turned out to be appropriate, especially with channels with a rectangular cross-section and a uniform cycle depth, that the width of the channel(s)(measured in the longitudinal direction of the cylinder) be set at in the region of the 0.7 to 1.2 times the thickness of the bridges between channels. The bridges are dimensioned in such a way that they provide directly an adequate support for load transfer to the hollow-cylinder mantle, without special components such as are needed in the cylinder section according to DE-OS 2,061,700.

In an embodiment of the present invention, a design of the channel(s) with various cycle depths is provided over the circumferences. In this case, the cycle depth is selected as small as possible in the regions where the original wall thickness of the cylinder, i.e. the thickness before the channels are made, is smallest. The greatest cycle depth is provided in the regions in which the original wall thickness is greatest. The transition between the largest and smallest cycle depths run completely smoothly and uniformly, because of the winding-vortex process envisioned for producing the channels. For a twin-screw extruder, a cylinder is recommended in which the largest cycle depth of the channel is about 3 to 5 times the smallest cycle depth, especially preferably about 4 times. In this case it may be appropriate to select something other than a rectangular shape and provide a conic expansion in the outward direction for the cross-section in the radial direction. The width of each channel thus increases in the outward direction. This means that the side surfaces of each channel in the section through the length of the cylinder do not run parallel, but include an angle, $\alpha$. This angle, $\alpha$, is advantageously in the range of 8–15°, especially about 10°. With a conic shape for the cross-section of the channels, it is recommended that the average thickness of the bridges between each pair of adjacent windings in the channel(s) be selected in the range of 1.5 to 4 times the average width of the channel(s). An average bridge width of about 2.5 times the average channel width is preferred.

In order to feed the tempering medium in and out in the simplest possible way, it is advantageously provided that in cylinders with several channels running parallel to one another, a groove going around the cylinder be made in the region of the front ends of the cylinder. The connections for feeding the tempering medium in and out are in this case arranged in a corresponding manner in the hollow-cylinder mantle in the region of one of the two grooves. In this way, the grooves thus receive the function of a distributor or collector for the individual channels, so that the tempering medium can be fed in and out as needed with a single line connection.

Beyond the low manufacturing costs, the cylinder according to the present invention provides an effective heat exchange, since through the effect of the cycle depth of the channels the flow path for the heat can be reduced within the wall of the cylinder as needed. Increased resistances to the flow of heat due to separation surfaces between individual components are avoided in the invention. For a given cylinder diameter, it makes no difference for the design of the hollow-cylinder mantle surrounding the cylinder how many channels, with which cross-section shape, and which cycle depths are provided in the cylinder.

BRIEF DESCRIPTION OF THE DRAWINGS

In the drawings wherein like reference characters denote similar elements throughout several views:

FIG. 5 is a cross-section along line V—V in FIG. 3;

FIG. 6 is a view of the left front side of the cylinder according to FIG. 1; and FIG. 7 is the cylinder according to FIG. 1 inserted into a cylindrical mantle in a partial side view and partial longitudinal section.

DETAILED DESCRIPTION OF THE PREFERRED EMBODIMENT

Figure 1:
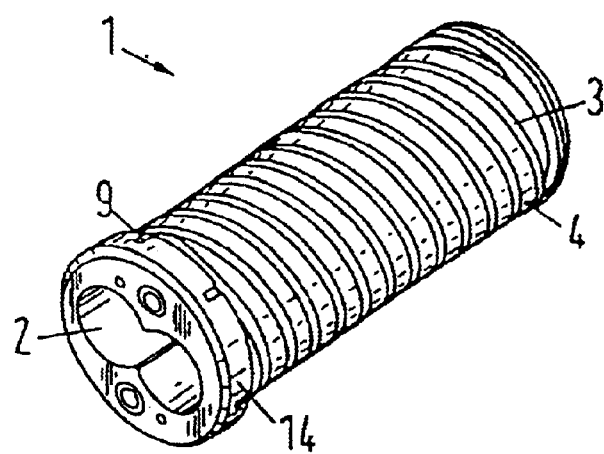
FIG. 1 is a perspective view of a cylinder according to an embodiment of the invention.

A cylinder 1 shown in perspective in FIG. 1 is provided for an extruder with a twin-screw unit and therefore has two partially overlapping holes for the two meshed screws (not shown), whereby the holes together form an extrusion space 2 with a cross-section in the shape of spectacles. An application flange 14 in the region of the front side of the cylinder 1 (on the left side in FIG. 1), has a diameter that is only slighter larger than that of the remainder of the length of the cylinder. On the outer side of the cylinder 1, a number of windings of channels 3 are provided in the shape of a helix, between which bridges 4 stand as separation walls.

Figure 3:
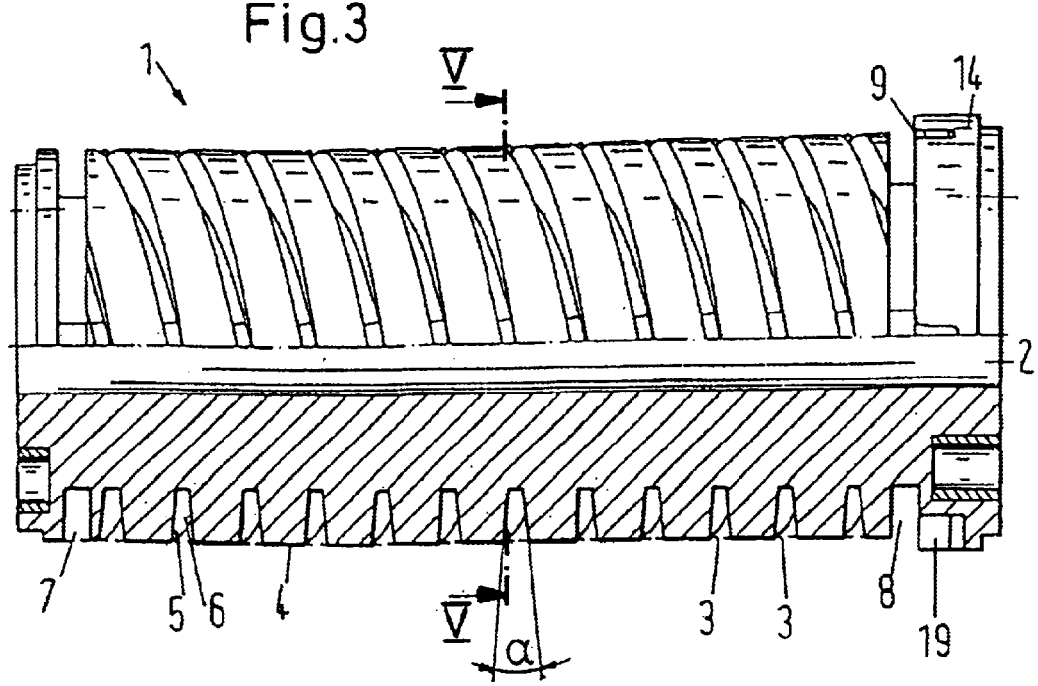
FIG. 3 is a longitudinal section along line III—III in FIG. 2.
Figure 4:
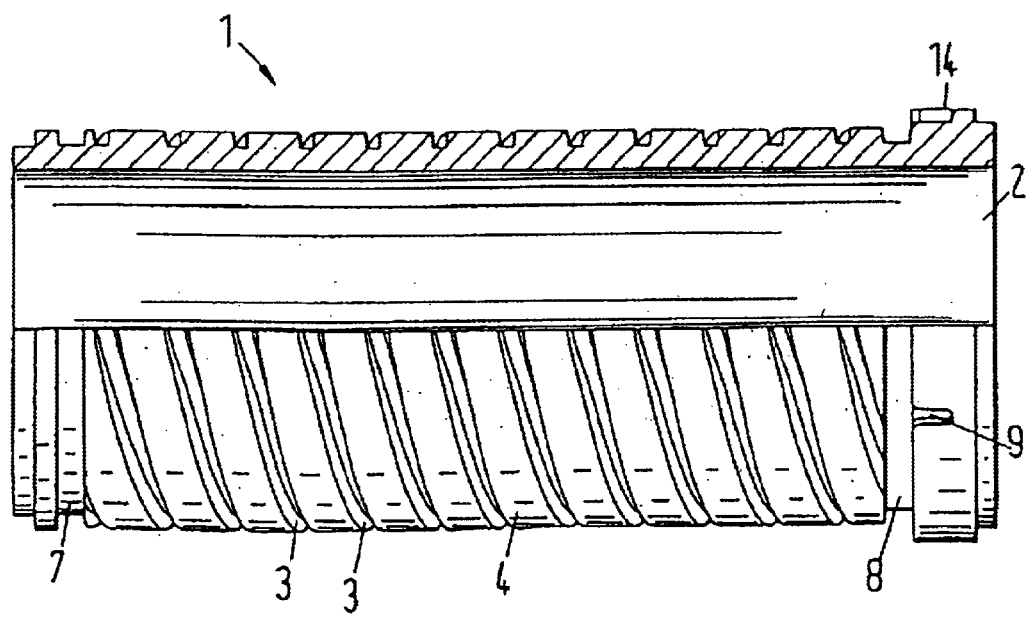
FIG. 4 is a longitudinal section along line IV—IV in FIG. 2.

The implementation of the channels 3 can be seen in detail from the section views of FIGS. 3 through 5. The axial longitudinal section in FIG. 3 shows that the channels 3 each have side walls 5, 6 that are at an angle α to each other, so that the channel width expands conically outward in the radial direction. The average width of the bridges 4 between the individual windings of the channels 3 is about 2 to 2½ times the average width of the channels 3 (measured in the longitudinal direction of the cylinder 1). It can be seen from FIG. 5 that a total of four channels are involved here, which extend at equal distances from each other in a helical shape over the axial length of the cylinder 1. It can also be seen from FIG. 5 that the cycle depth of the channels 3, i.e. the radial depth, is not constant over the course of the circumference of the cylinder 1, but changes uniformly in the region near the planes through the longitudinal axis of the extrusion space 2, in which the cycle depth in the channels 3, indicated by $h_2$, is the greatest. The uniform change of the cycle depth between the largest value, $h_2$, and the smallest value, $h_1$, results in a simple manner from a corresponding setting of the process parameters used in the winding vortex process used in producing the channels 3. Whereas FIG. 3 shows a side view and a longitudinal cross-section in the region of the smallest cycle depth, $h_2$, in FIG. 4 a longitudinal section is shown, rotated by 90° i.e., in the region of the smallest cycle depth. By varying the cycle depth over the circumference of the cylinder 1, extreme differences in heat flow between the extrusion space 2 and the channels 3 over the circumference of the cylinder 1 are greatly reduced. Each of the four channels 3 opens into a groove 7, 8 that respectively runs around and near to the end of the cylinder 1. The grooves 7, 8 act as a distributor and a collector for the tempering fluid to be fed through the channels 3.

Figure 2:
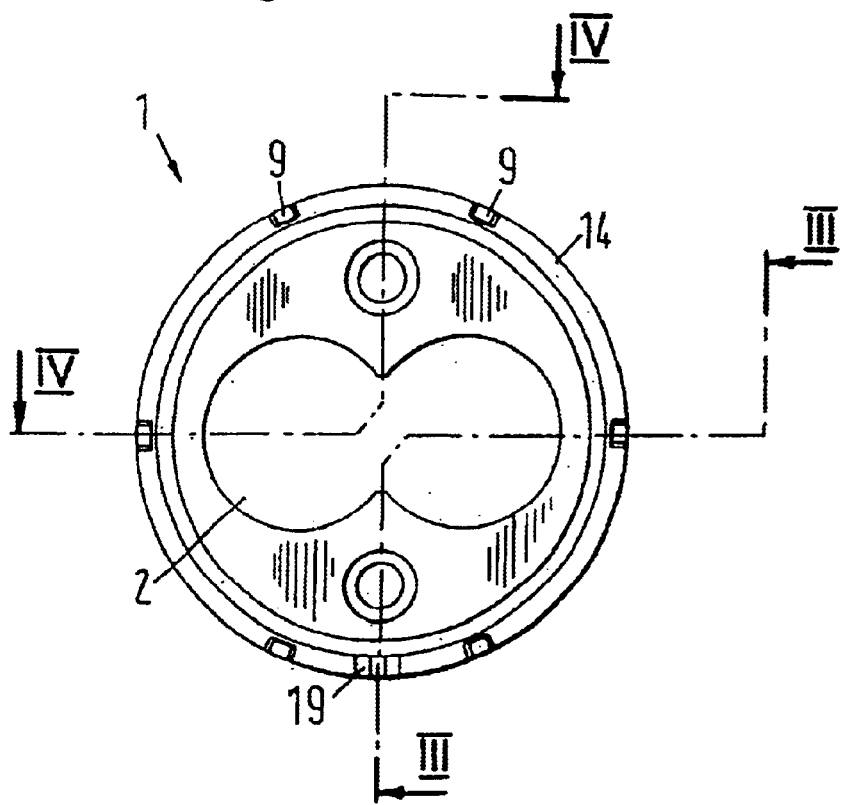
FIG. 2 is a view from the right front side of the cylinder according to FIG. 1.

In FIG. 6, a view of the front side of the cylinder 1 is shown with the application flange 14. As can also be seen in FIG. 2, holes to accept adjusting bolts 15 are provided in the region of the greatest wall thickness. (The adjusting bolts are shown in detail in the side view of FIG. 7). A complete cylinder assembly 11, consisting of the cylinder 1 and the associated hollow-cylinder mantel 10, in halves in the longitudinal section, is shown in FIG. 7. The hollow-cylinder mantle 10, which has connecting flanges 17, 18 on each of its two ends, has a smooth inner surface. Only in the region of the application flange 14 does it have a section with an enlarged inner diameter, which corresponds to the outer diameter of the application flange 14 of the cylinder 1, so that the application flange 14 can be applied in this section and be held as a stop against shifts by the cylinder 1 in the longitudinal direction. The inner diameter of the hollow-cylinder mantle 10 corresponds to the outer diameter of the bridges 4 of the cylinder 1, which is thus embedded as a "moist bushing" in the hollow-cylinder mantle 10, so that the individual windings of the channels 3 are closed in the radial direction toward the outside. There is a radial hole through the connection surfaces 17, 18 for feeding the intake 12 and the outlet 13 of the tempering medium, which end in the region of the circumferential grooves 7, 8. The connection between the circumferential groove 8 and the outlet 13 is not as direct as between the circumferential groove 7 and the intake 12. Rather, the connection is made in this case through an indentation 19 in the application flange 14. The tempering medium can thus flow through the intake 12 in the circumferential groove 7, which functions as a distributor, and from there into the four channels 3 in the shape of a screw line. After flowing through the channels 3, the tempering medium arrives at the circumferential channel 8, which functions as a collector and is there again removed through the indentation 19 and the line 13 from the full cylinder assembly 11. During the flow through the channels 3, an effective heat exchange takes place between the tempering medium and the extrusion space 2.

To prevent the cylinder 1 from turning with respect to the hollow-cylinder mantle 11, stop grooves 9 are provided in the region of the circumference of the application flange 14, into which pin screws 16 make contact through corresponding holes made radially through the connection flange 18. Through the connection flanges 17, 18, several full cylinder assemblies 11 can be connected together. In this case it is obviously possible, with a hollow-cylinder mantle 10 of unchanged construction with respect to the channels, to use various cylinders 1, in order to meet optimally the different needs for heat exchange (cooling or heating) along the extrusion space.

With the cylinder according to the invention, a very cost-favorable solution that is very effective in regard to the technical requirements is offered for the process-oriented tempering of a screw extruder.

What is claimed is:

1. A cylinder assembly for a twin-screw extruder, comprising a cylinder having a variable wall thickness defining an extrusion space for receiving twin screws of the twin-screw extruder and a hollow-cylinder mantle surrounding the cylinder, wherein at least one channel having a helical shape and a cycle depth is formed on an outer side of the cylinder by a winding vortex process and an inlet and outlet are formed in the hollow-cylinder mantle in communication with the at least one channel for allowing a flow of a tempering medium from the inlet to the outlet via the at least one channel, the hollow-cylinder mantle closing the at least one channel, and wherein the cycle depth of the at least one channel varies along the circumferential direction of the cylinder such that the cycle depth is largest in regions where the wall thickness of the cylinder is largest and the cycle depth is smallest in regions where the wall thickness of the cylinder is smallest.

2. The cylinder assembly of claim 1, wherein said at least one channel comprises a plurality of channels.

3. The cylinder assembly of claim 1, wherein a pitch of said channels along a longitudinal direction of the cylinder is constant.

4. The cylinder assembly of claim 1, wherein the at least one channel comprises a rectangular cross-section.

5. The cylinder assembly of claim 1, wherein the cylinder also forms bridges between adjacent windings of the at least one channel having a width in the longitudinal direction, the width of the at least one channel being in the range including 0.7 to 1.2 times the width of the bridges.

6. The cylinder assembly of claim 1, wherein the at least one channel has a variable cycle depth having a largest cycle depth and a smallest cycle depth, the largest cycle depth being within the range of 3 to 5 times the smallest cycle depth.

7. The cylinder assembly of claim 1, wherein the at least one channel has side walls arranged so that the width of the at least one channel increases from a radially inner portion to a radially outer portion of the at least one channel.

8. The cylinder assembly of claim 7, wherein the side walls are arranged at an angle relative to one another, the angle being within the range including 8–15 degrees.

9. The cylinder assembly of claim 1, wherein the cylinder also forms bridges between adjacent windings of the at least one channel, wherein an average thickness of the bridges between two adjacent windings of the at least one channel is in the rage of 1.5 to 4 times the average width of the channels.

10. The cylinder assembly of claim 1, wherein said cylinder further comprises circumferential grooves respectively arranged proximate opposing ends of the cylinder such that said at least one channels opens into said circumferential grooves, and each of the inlet and outlet in the hollow-cylinder mantle open into one of the circumferential grooves.

* * * * *